Feb. 19, 1974   C. A. HAGA   3,793,424
MELT-CAPTIVATING APPARATUS AND METHOD
Filed March 8, 1972   2 Sheets-Sheet 1

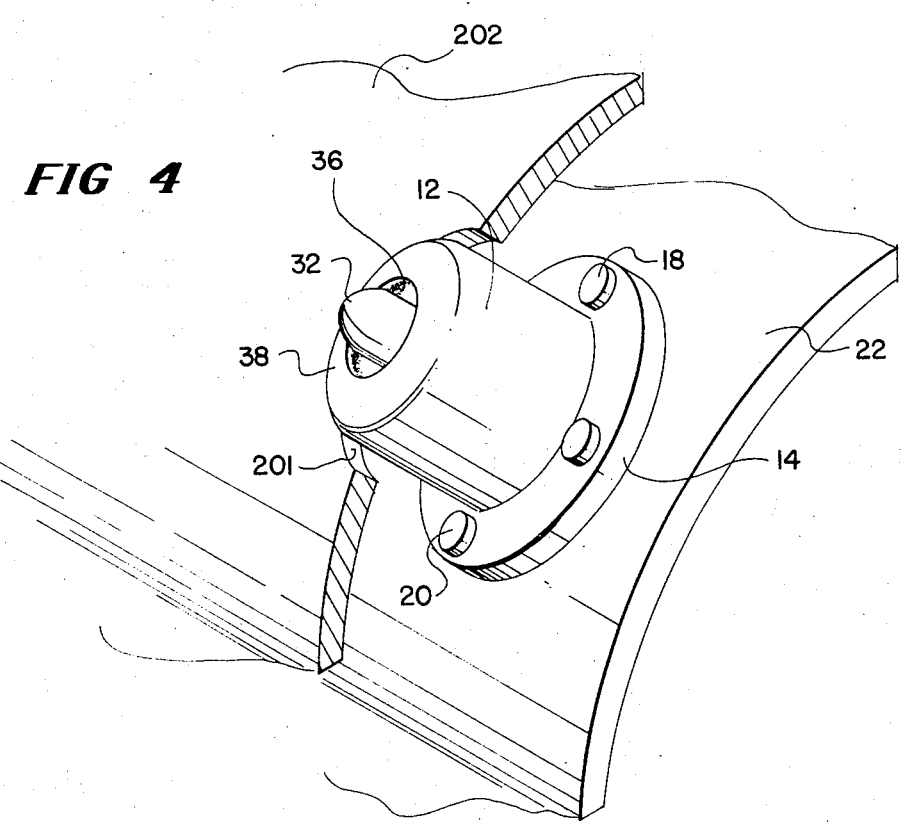
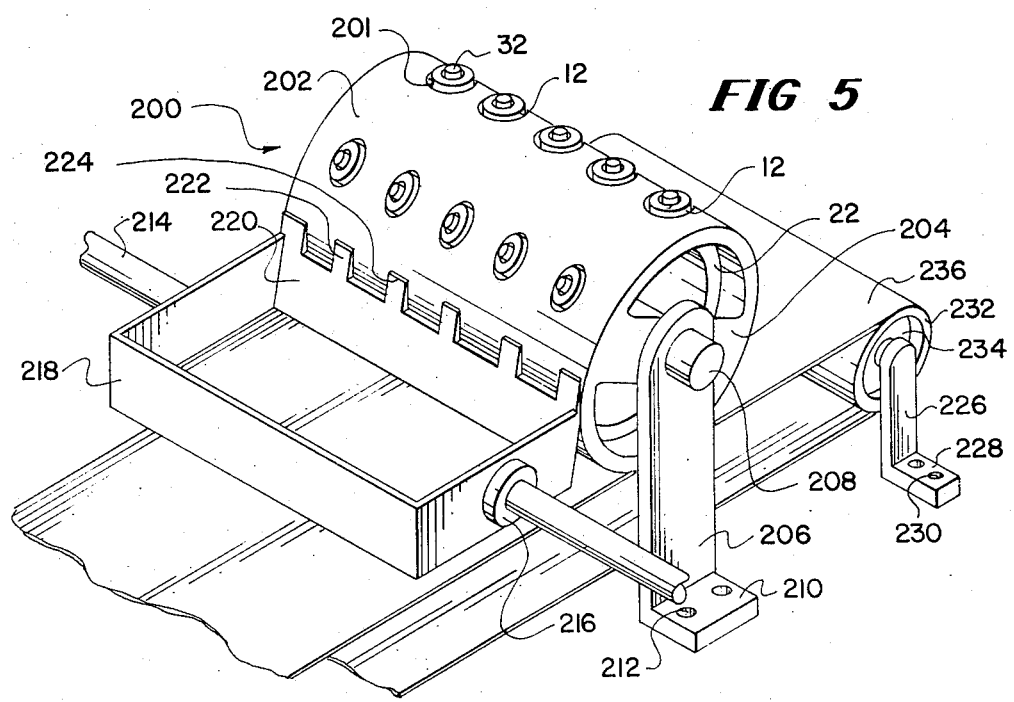

United States Patent Office 3,793,424
Patented Feb. 19, 1974

3,793,424
MELT-CAPTIVATING APPARATUS AND METHOD
Clarence A. Haga, 9459 Arlington Blvd.,
Fairfax, Va. 22030
Filed Mar. 8, 1972, Ser. No. 232,686
Int. Cl. B29c 29/00
U.S. Cl. 264—154    3 Claims

ABSTRACT OF THE DISCLOSURE

A method and apparatus for removing thermoplastic articles from solid waste. The apparatus has a high heat conductive core element surrounded by a ceramic member having a captivation chamber on its working end. The thermoplastic material is contacted and the heat from the core element causes it to flow and, as it flows, it forms a mechanical bond with the captivation chamber.

---

Figure 1:
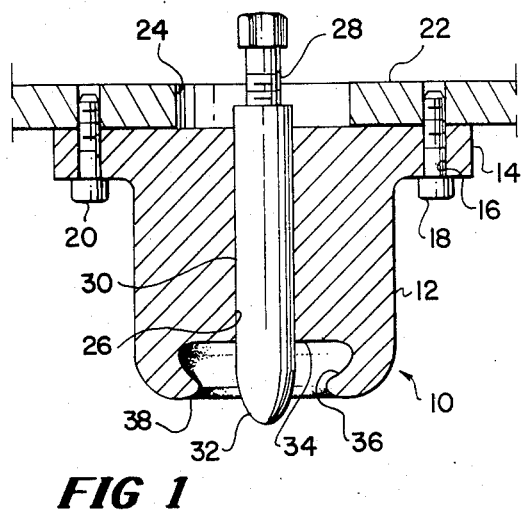

This invention relates to a new and unique method and apparatus for handling plastics and more specifically for reclaiming plastic material from solid waste. In particular, it relates to an economical and novel method of separating thermoplastic materials from the various kinds of solid waste.

While the amount of waste generated has increased, both in total volume and per capita, the percentage reclaimable waste has decreased due to the ever-increasing usage of plastics in the industrial and consumer segments of society, e.g., in the packaging industry. The latter industry in part bases its growth on the nonreturnable packages products are marketed in.

There has been very little effort to date in providing a workable system for separating plastics from the remainder of solid waste. Such a step is necessary since metal reclamation and paper reprocessing cannot be effectively implemented until the plastics are physically separated from the combined waste. Failure to remove plastics results in poor quality reprocessing of metals and paper products by chemical and heat treating methods. Once plastics have been removed, paper and metal can be easily separated by a variety of conventional methods. These methods, however, cannot be employed to separate plastics from solid waste due to the varying thicknesses, densities and shapes of plastic items.

The instant system and method also has application in the new attempts at reprocessing plastics themselves.

The instant invention relates to physical separation of thermoplastics as opposed to thermosetting plastics, such as fiberglass. The common characteristic of all thermoplastic materials is that they melt at a temperature lower than the combustion temperature of most other solid waste.

Since complete melting of plastic materials would cause fusing and intermingling of the material with other solid waste, the instant system applies a spot melting technique to the material. A high heat is applied briefly, causing localized melting, and the material is allowed to cool and cooperate with the heating unit to form a physical connection therewith. The heating unit is withdrawn from the area of combined waste and the plastic material physically removed. The heating unit "captivates" the melted portion of the plastic article and holds the article until a physical force dislodges the plastic at a point removed from the waste and later in time.

The method can take the form of a stationary system in which the waste is fed through the apparatus on a conveyor or the like. It also can take the form of a vehicle or a trailer which can move or be moved in relation to a mass of solid waste. The system can be used at trash collection stations prior to the waste being taken to the point of disposal or at landfill sites. Of course, the system can be utilized at any location where the accumulation of solid waste justifies the cost of separation.

At a typical separating station a hopper receives the solid waste from the means used to transport it to the station. The solid waste is then fed from the hopper into a hammer or shredding mill where it is crushed and otherwise milled into a predetermined uniform size.

The milled waste is then transferred, by any conventional means, to a station for removal of fine paper, plastic film, cloth fibers and any other material that can be drawn through a restricted opening by either a combing operation or a vacuum chamber. Either of these operations allow the solid and ridged waste to pass to another station within the apparatus. The separated fine material can be treated further or compacted for disposal.

The next station in the apparatus is designed to separate the solid thermoplastics from the other waste. As the combined solid wastes enter the station it is spread and distributed in such a manner that at least one surface of each article is exposed to the separating heating unit. The separating unit can take the overall configuration of a conveyor belt, a drum, a series of drums, a vertically movable member, an oscillating rack, etc.

If the conveyor form is employed, the belt surface has a series of melt-captivating heating units attached thereto. A rotating pressure pad or pads are used to force the belt surface containing the heating units down into contact with the solid waste which is moving along on an adjacent conveyor belt. The belts are preferably travelling in the same direction and at the same speed to insure sufficient contact between the waste surfaces and the melt-captivating heating units. The belt containing the heating units is then directed away from the solid waste conveyor belt to remove the captivated thermoplastics to another location for physical removal and either disposal or reprocessing.

The physical separation of the melt-captivated thermoplastic articles is accomplished by a stripper or picker having tines. The stripped plastic material is either picked up by another conveyor or gravity fed into a hopper.

Accordingly, it is an object of this invention to provide a novel apparatus and method for separating thermoplastics from other materials.

It is a further object of this invention to provide a novel apparatus and method of engaging thermoplastic materials and articles at one location and transferring them to a second location.

A further object of this invention is to provide a novel means for separating thermoplastics from solid waste.

Another object of this invention is to provide an apparatus for removing thermoplastic waste from other solid waste with which it is combined which can be incorporated into existing systems for handling and disposal of solid wastes.

A still further object of this invention is to provide an apparatus for removing thermoplastic materials from solid waste which is transportable from one location to another.

Figure 2:
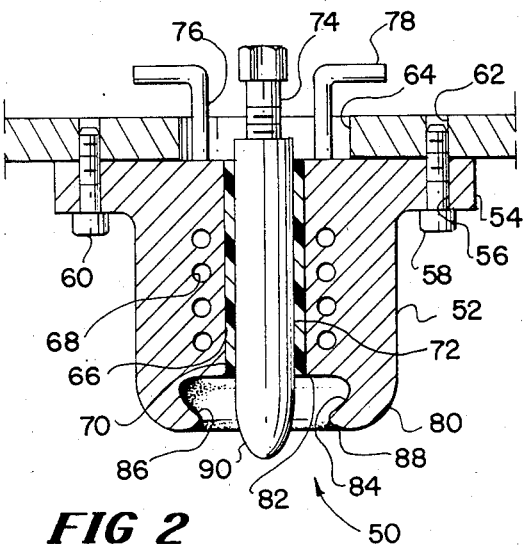
Figure 3:
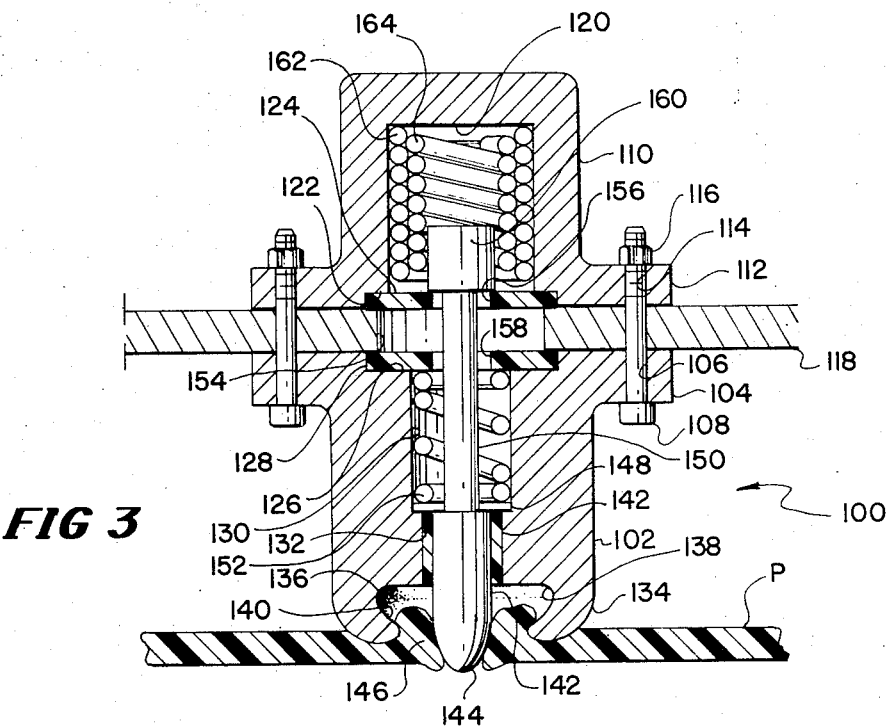

These and other objects of the invention will become readily apparent when reference is had to the accompanying drawings in which:

FIG. 1 is a cross-sectional view of a melt-captivating heating unit,

FIG. 2 is a cross-sectional view of a further embodiment of a melt-captivating heating unit, FIG. 3 is a cross-sectional view of a third embodiment of a melt-captivating unit showing the unit acting upon a thermoplastic surface, FIG. 4 is a partial perspective view of the installation of a melt-captivating unit on a rotary drum, FIG. 5 is a perspective view of a thermoplastic separating station showing a roller with a plurality of melt-captivating units thereon and a picker bin for removing thermoplastic articles from the surface of the roller.

Referring now to FIG. 1, there is shown a melt-captivating unit generally designated as 10. It consists of a generally cylindrical member 12 having a flange 14 thereon. Flange 14 has a plurality of bores, such as 16 which are adapted to align with threaded bores in a rotary drum 22, or conveyor belt, etc. The particular transferring mechanism, a rotary drum as shown in FIGS. 1–3, has a large aperture 24 cut therein through which passes a heating cylinder 30 and a bolt 28, secured within a threaded bore in the end of cylinder 30. Cylinder 30 is tapered at its opposite end to provide a smooth tip, although a pointed tip can be employed. The end of member 12 is relieved as shown in FIG. 1 adjacent the tapered end of cylinder 30. The configuration provides an inward curving cylindrical lip 38 merging into a reverse curved wall 36. Wall 36 merges with flat surface 34 and together they form a captivation chamber. It is important that the end of heating cylinder 30 project beyond the end of member 12 since its tapered end 32 must come into contact with the surface of a thermoplastic article. Cylinder 30 is preferably constructed of a high heat conductive metal presently available. Member 12 is preferably constructed of a low conductive material such as a ceramic.

Cylinder 30 can be solid or hollow and heated by an electrical heat supply, induction friction, hot air, etc. Surrounding member 30 can be additionally cooled by a cooling fluid.

Referring now to FIG. 2, there is shown a second embodiment of the melt-captivation heating unit designated generally as 50. It consists of a low conductive element 52 having a flange portion 54 which is secured to a supporting plate by machine screws 58, 60 passing through bores such as 56 and anchoring in threaded bores such as 62 in the supporting plate.

The element 52 is centrally bored as at 66 to receive a cylindrical insulating element 70 made of a material such as asbestos having low heat conductive characteristics. The element 52 can be parted as at 68 to provide passages for cooling fluid which is pumped into the element through pipe 76 and out through pipe 78. Any suitable cooling fluid can be employed. Mounted within insulating cylinder 70 is a heating element 90 having a machine screw 74 threaded into one end thereof for attachment to a wire or cable carrying induction current, for example.

The working end of heating element 90 is tapered, similar to element 30 in FIG. 1, and the element 52 has a recessed captivation chamber 82 having curved wall portions 84, 86 and 88.

The cooling fluid in passages 68 normally acts to keep the temperature of element 52 down and insulating cylinder 70 keeps the heat of element 90 from being transmitted to element 52.

A further embodiment of the invention is illustrated in FIG. 3 and is generally designated as 100. An element 102 is cylindrical in configuration and has a flange portion 104 at its upper end. Flange 104 is bored as at 106 to allow for the passage of bolts such as 108 therethrough. The bolts secure flange 104 to a mounting plate 118 and to the flange portion 112 of another cylindrically configured portion 110. Portion 110 has bores 114 in its flange 112 to allow for the bolts 108 to pass through and receive nuts such as 116 on the ends thereof.

Portion 110 has a chamber 120 therein which contains winding layers 162, 164 of a heating coil. The bottom of chamber 120 is counterbored as at 122 and receives a washer 124 made of a low heat conductive material. An identical insulating washer 128 is received within a counterbore 126 of element 102. Both washers 124 and 128 have apertures 156, 158 therein, respectively, for allowing plunger rod 150 to move freely between chamber 120 and a chamber 130 in element 102. Chambers 120 and 130 are coaxial and the former contains a compression spring 152 which normally acts between washer 154 and a washer 149. Washer 148 is mounted on rod 150 and abuts a head portion 142 of rod 150 which constitutes the working end of the heating element. The end of head portion 142 is tapered as at 144 and cooperates with a chamber 138 having reversed curved walls 136 and 140 to captivate the flowable portion 146 of a plastic member.

The opposite end of rod 150 has an enlarged cylindrical portion 160 thereon which rides within the inner coil windings 164.

Plate 118 has an aperture 154 therein which is of lesser diameter than washers 124, 128, thus maintaining them within counterbores 122 and 126 respectively. The head portion 142 of the heating element rides within an insulating sleeve 142 which is press-fitted or otherwise secured within bore 132.

As seen in FIG. 3, where the enlarged head portion is heated by current passing through coils 164 and then thrust downwardly by a second current passing through coils 162, it projects out beyond the lower part of element 102 and engages the surface of the plastic member P. As the tip 144 engages plastic member P, it causes it to melt and flow, as at 146, around and away from the tip.

Simultaneously with the heated tip engaging the plastic member P, the entire unit 100, including element 102 with its capivation chamber 138 is being thrust downwardly against the plastic member. This causes the end of element 102 to press into the plastic causing the flow, as at 146, to move upwardly into chamber 138 along reversed curved wall 140.

Since the diameter of the melted thermoplastic with chamber 138, is greater than the diameter of the entrance to the chamber, the plastic member or article P will move with unit 100 when unit or assembly 100 is moved upwardly and heating tip 144 is withdrawn and/or cooled. This action takes place in the case of tips 32 and 90 which are merely cooled and not also withdrawn as is the case with tip 144. The reversing of the current in coil 162 acts on portion 160 to withdraw rod 150 and heating tip 144 from the thermoplastic member.

FIG. 4 shows the installation of a captivation unit similar to that shown in FIGS. 1–3, in particular that of FIG. 1. Double layers 22, 202, of a rotating drum are provided and the basic element 12 is mounted to inner layer 22 by machine screws such as 18, 20. The external layer, or working surface of the drum is relieved as at 201 to allow the working end 38 of element 12 to project therethrough. The chamber 36 and heating tip 32 are seen in FIG. 4 as radially projecting beyond layer 202.

The subassembly of FIG. 4 is shown in FIG. 5 together with the major components of a thermoplastic captivating station designated generally as 200. The drum carrying the heat captivating units is shown as having an outer layer 202, an inner plate or layer 22 and a cross portion 204 by which the drum is supported. A rod 208, which passes through member 204, is supported on plate member 206 having an L-shaped flange 210 with mounting holes 212 therein. A plurality of heat captivating elements 12 are shown protruding through an outer layer 202 of the drum.

Mounted beneath the drum is a conveyor belt 236 for carrying the solid wastes containing thermoplastic articles beneath and into engagement with the drum. Belt 236 is trained around roller 232 having a recessed center 234. The roller 232 is mounted for rotation by a rod supported by bracket 226 having flange 228 and mounting holes 230.

The drum is positioned so that it urges belt 236 downwardly as the belt and solid waste pass beneath it. This is to insure that as the thermoplastic melts, it will flow up into the captivation chamber prior to cooling and thus becoming "locked" or "captivated" therein.

Located on rod 214 and adjacent the drum is a plastic collecting box or hopper 218. Hopper 218 is generally rectangular and has a front lip 220 with a plurality of teeth 222, 224 thereon. The hopper teeth are adapted to scrape the "captivated" thermoplastic items or articles from the drum and allow them to fall into the hopper 218. A spring unit may be mounted within flange 216 to allow for a slight "give" to the hopper or biasing action to avoid jamming problems. The hopper teeth naturally are spaced so as to engage the surface of the drum on either side of the captivation units and to avoid possible damage thereto by direct contact therewith.

Once the hopper is filled it can be replaced by another or quickly dumped and returned to position by sliding along rod 224.

The melt-captivating units may have one spot or any number of miniature spot heaters. The heat supply may be electrical, induction, friction, hot air, etc.

Water or any number of chemicals or gases may be used to cool the melt-captivating units.

The size, shape and weight of the thermoplastic materials or waste that can be separated out from other solid waste by this method and apparatus is only restricted by the particular design configuration of the particular apparatus.

In the case of the design shown in FIG. 3, the heating element can be continuously heated. Any of the units can be made to heat quickly upon engagement by the tip or surrounding insulation element with solid wastes.

Of course, the heating temperatures may be varied to suit conditions such as in the case of waste that has been wet down or treated with flame retarding chemicals.

Commercial solvents or mechanical scrubbers can be used to clean the elements if they become clogged with debris and/or melted plastic. Such a cleaning procedure can be incorporated into the basic system to cleanse it once for every predetermined number of revolutions.

The method of this invention can be employed in a mobile separating operation. In such an operation, a tractor of the type conventionally used at landfill sites pulls a trailer having a melt-captivating system mounted therein. Alternatively, a tractor can have the system mounted thereon or incorporated therewith.

Such a system utilizes the tractor to scoop up the solid waste. The waste is fed into a chopping mill, incorporated into the system, which bursts bags, crushes boxes, etc. and chops the waste in particle or pieces of a predetermined size. The chopped waste then passes through the separator where the thermoplastic is melt-captivated and stored in a hopper. The remaining solid waste is then discarded from the tractor or trailer while the vehicle moves to cause a uniform spread.

The melt captivating system may also take the form of a tractor or vehicle which moves over the surface of the landfill to bring apparatus depending therefrom into engagement with the surface. A depending mill first crushes the waste and chops it, thus allowing a preceding and depending melt captivating assembly to come into contact with the crushed and chopped pieces to engage them. Such an assembly may take the form of a biased depending drum, similar to that shown in FIG. 5, or a hydraulically operated planar surface containing a plurality of melt-captivating units which the operator lowers and raises sequentially. As the planar surface is raised, a hopper and scraper may slide along the surface to collect the "captivated" plastic pieces.

A group of drums having melt-captivating units thereon may be employed to entrap thermoplastic waste and, similarly, a group of scraper drums may be used to detach the melt captivated plastic from the units. The detached plastic pieces may then be gravity fed to a hopper or drawn off by a vacuum.

The retractable heating element of FIG. 3 can be operated hydraulically, pneumatically or by mechanical means, such as cams. Electrical actuators triggered by contact switches, photocells, heat switches, etc. can be employed to activate any one of the aforementioned control systems.

The separation of solid waste, while an immediate application of the melt-captivating units and method comprising this invention, is not the only application contemplated. The apparatus and method can also be employed as a material handling method, e.g., in lifting and moving material mounted on disposable thermoplastic pallets. Other applications include the transportation of articles in a production or assembly area. In such applications, the moved article or item can be jarred loose or simply released by again heating the element and surrounding region of the captivated plastic and simultaneously removing the heating element from contact with the plastic.

Since thermoplastics can be melted, hardened and remelted many times without an apparent loss of strength, the "captivated" items can be used repeatedly without replacement.

While only a few applications and embodiments have been described, it will be obvious to those of ordinary skill in the art that many changes and modifications may be made without departing from the scope of the appended claims.

What is claimed is:

1. A method of handling thermoplastic materials comprising:
    (a) locally heating a small area of the thermoplastic material with a tapered tip of a heating element, of high thermal conductivity,
    (b) engaging said material with a second element of low thermal conductivity and having a captivation chamber around and adjacent said tip, said chamber having an opening surrounding said working tip and increasing in volume in a direction away from said material to thereby create an enlarged portion of said chamber.
    (c) continuing heating said material while biasly engaging said material until a portion of the melted plastic flows into the enlarged portion of said chamber around said working tip,
    (d) allowing said melted plastic material to cool, thereby providing a physical mating of said plastic material to said second element.

2. A method as in claim 1 and further comprising the additional steps of:
    (e) moving said second element and said material from a first position to a second position,
    (f) reheating said material with said first element to separate the material from said second element.

3. A method as in claim 1 and further comprising the additional steps of:
    (e) moving said second element and said material from a first position to a second position; and
    (f) engaging said material with a separating member and forcing it out of said captivation chamber.

References Cited
UNITED STATES PATENTS

| 2,890,541 | 6/1959 | Siegel | 264—249 |
| 3,164,653 | 1/1965 | Inouye | 264—334 |
| 2,587,337 | 2/1952 | Lay | 264—318 |

ROBERT F. WHITE, Primary Examiner

T. E. BALHOFF, Assistant Examiner

U.S. Cl. X.R.
209—74 R; 264—249, 294, 318